(12) United States Patent
Morovic et al.

(10) Patent No.: US 10,445,929 B2
(45) Date of Patent: Oct. 15, 2019

(54) THREE-DIMENSIONAL THRESHOLD MATRIX FOR THREE-DIMENSIONAL HALFTONING

(71) Applicant: Hewlett-Packard Development Company, L.P., Houston, TX (US)

(72) Inventors: Peter Morovic, Sant Cugat del Valles (ES); Jan Morovic, Colchester (GB); Jay S. Gondek, Camas, WA (US); Juan Manuel Garcia Reyero Vinas, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/544,504

(22) PCT Filed: Apr. 16, 2015

(86) PCT No.: PCT/US2015/026213
§ 371 (c)(1),
(2) Date: Jul. 18, 2017

(87) PCT Pub. No.: WO2016/167776
PCT Pub. Date: Oct. 20, 2016

(65) Prior Publication Data
US 2017/0365095 A1 Dec. 21, 2017

(51) Int. Cl.
*H04N 1/405* (2006.01)
*G06T 17/10* (2006.01)
*B33Y 50/00* (2015.01)

(52) U.S. Cl.
CPC .............. *G06T 17/10* (2013.01); *B33Y 50/00* (2014.12); *H04N 1/405* (2013.01)

(58) Field of Classification Search
None
See application file for complete search history.

(56) References Cited

U.S. PATENT DOCUMENTS

| 5,838,567 A | 11/1998 | Boggio, Jr. |
| 2004/0080078 A1 | 4/2004 | Collins |
| 2004/0183796 A1 | 9/2004 | Velde et al. |

(Continued)

OTHER PUBLICATIONS

Ancin et al. "New void-and-cluster method for improved halftone uniformity", Journal of Electronic Imaging 8(1), 104-111 (Jan. 1999) (Year: 1999).*

(Continued)

*Primary Examiner* — Yanna Wu
(74) *Attorney, Agent, or Firm* — HP Inc. Patent Department

(57) ABSTRACT

Certain examples described herein relate to a three-dimensional threshold matrix. The three-dimensional threshold matrix may be used for three-dimensional halftoning. In one example, values for a predefined two-dimensional threshold matrix are shifted with respect to a third dimension to provide the three-dimensional threshold matrix. In one example, the three-dimensional threshold matrix may then be processed in association with a digital representation of a three-dimensional object to output discrete material arrangement instructions for at least one production material. The instructions may be used to control an additive manufacturing system to produce the three-dimensional object.

7 Claims, 3 Drawing Sheets

(56) References Cited

U.S. PATENT DOCUMENTS

| | | |
|---|---|---|
| 2005/0072113 A1 | 4/2005 | Collins et al. |
| 2006/0013471 A1 | 1/2006 | Flieswasser et al. |
| 2010/0195122 A1 | 8/2010 | Kritchman |
| 2011/0249048 A1 | 10/2011 | Gullentops et al. |
| 2013/0073068 A1 | 3/2013 | Napadensky |
| 2014/0277661 A1 | 9/2014 | Amadio et al. |
| 2016/0107380 A1* | 4/2016 | Smoot .................. B29C 64/124 264/401 |

OTHER PUBLICATIONS

International Search Report and Written Opinion dated Jan. 18, 2016, PCT Patent Application No. PCT/US2015/026213, filed Apr. 16, 2015, Korean Intellectual Property Office.

Chi Zhou, et al., "Three-Dimensional Digital Halftoning for Layered Manufacturing Based on Droplets", Epstein Department of Industrial and Systems Engineering, University of Southern California, May 24, 2009.

* cited by examiner

THREE-DIMENSIONAL THRESHOLD MATRIX FOR THREE-DIMENSIONAL HALFTONING

CLAIM FOR PRIORITY

The present application is a national stage filing under 35 U.S.C. § 371 of PCT application number PCT/US2015/026213, having an international filing date of Apr. 16, 2015, the disclosure of which is hereby incorporated by reference in its entirety.

BACKGROUND

Apparatus that generate three-dimensional objects, including those commonly referred to as "3D printers", have been proposed as a potentially convenient way to produce three-dimensional objects. These apparatus typically receive a definition of the three-dimensional object in the form of an object model. This object model is processed to instruct the apparatus to produce the object using one or more production materials. This may be performed on a layer-by-layer basis. The processing of the object model may vary based on the type of apparatus and/or the production technology being implemented. Generating objects in three-dimensions presents many challenges that are not present with two-dimensional print apparatus.

BRIEF DESCRIPTION OF THE DRAWINGS

Various features of the present disclosure will be apparent from the detailed description which follows, taken in conjunction with the accompanying drawings, which together illustrate, by way of example, features of the present disclosure, and wherein.

DETAILED DESCRIPTION

Figure 1:
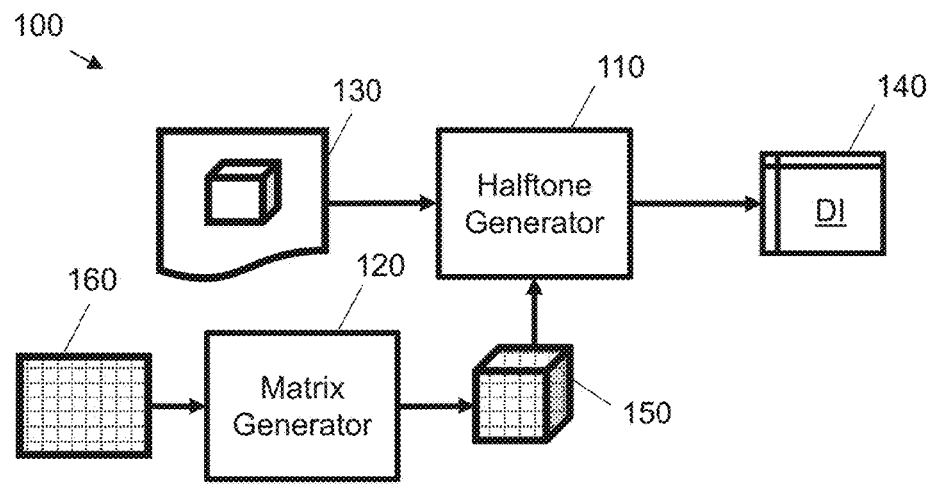
FIG. 1 is a schematic diagram showing an apparatus for generating control data for production of a three-dimensional object according to an example.

In the production of three-dimensional objects, e.g. in so-called "3D printing", there is a challenge to control the structure of generated objects. For example, it may be desired to produce objects with a variety of structural properties, which may influence, or be influenced by, material properties and/or mechanical properties of a produced object. There is also a desire to flexibly control the structure of produced objects. In certain cases, it may be desired to vary a structure of at least one part of an object model without having to re-design or re-generate the object model. For example, it may be desired to produce structural variations of a common object design, such as producing a first set of objects with one substructure and producing a second set of objects to the same design but with a different substructure. As may be appreciated, such considerations are not present with two-dimensional printing.

Certain examples described herein enable a three-dimensional matrix to be generated for use in a halftone thresholding operation. The three-dimensional matrix in these examples is generated from a defined halftone matrix in two-dimensions, e.g. a halftone threshold or screen matrix as may be applied for two-dimensional halftoning. In these examples, the defined halftone matrix is distributed in three-dimensions in a manner that enables three-dimensional constraints to be applied. Values for the defined halftone matrix are used to generate a set of two-dimensional matrices, e.g. sub-matrices in relation to the three-dimensional matrix. These matrices or sub-matrices are then laterally shifted in a third dimension to generate the three-dimensional matrix. The three-dimensional matrix may then be applied to a digital representation of an object to be produced in a halftone thresholding operation to generate control data for use in producing the object. For example, the output of the halftone thresholding operation may comprise material arrangement instructions, e.g. deposit instructions, for an additive manufacturing system. By controlling the form of the three-dimensional matrix used for thresholding, the three-dimensional structure of a three-dimensional object may be controlled. This allows design flexibility; the structure of the whole or a part of a three-dimensional object may be modified by changing a defined sequence used to stack the sub-matrices. Additionally, features such as clustering of material placement, layer-to-layer overprinting, and a path-based stacking of layers of the three-dimensional object may be applied.

Certain examples described here enable a three-dimensional object with a desired structure to be produced without modifying a substantial portion of an object processing pipeline. These examples also reduce the need for specific choices to be made during the design of the object, e.g. volumes or object models of the designed object need not exhibit the desired structure when the object is sent for production. This is achieved by allowing choices associated with at least one structure of the object to be made at a stage in an object processing pipeline after design yet before production of the object, e.g. such as when a designed object is submitted as a "3D print job". In the case of an object design featuring a simple cube, this allows the same cube to be produced with, for example, any of the following: substructure that places defined materials close to each other; substructure that distributes a set of materials throughout an object; substructure that maximizes a connectivity of material portions from layer to layer; or substructure that minimizes a connectivity of material portions from layer to layer. In certain cases, a rasterized version of the object design that specifies material use for volumes of the object (voxels) is halftoned using a three-dimensional matrix that is generated at or near production time based on a desired substructure. In particular, layers of the three-dimensional matrix are shifted during generation of the matrix to allow this.

FIG. 1 shows an example of an apparatus 100 arranged to generate control data for the production of a three-dimensional object. The apparatus 100 comprises a halftone generator 110 and a matrix generator 120. The halftone generator 110 is arranged to receive a digital representation 130 of the three-dimensional object and to output discrete material arrangement instructions 140 for at least one production material. To generate the material arrangement instructions 140 the halftone generator 110 is arranged to process the digital representation 130 in association with a three-dimensional threshold matrix 150. In certain cases this may comprise comparing at least a portion of the digital representation 130 to a corresponding portion of a three-dimensional threshold matrix 150 or an equivalent operation. In one case, the halftone generator 110 is arranged to perform a halftone thresholding operation on a material-use value associated with a volume of the digital representation 130, such as a voxel, using a halftone threshold value retrieved from a location in the three-dimensional threshold matrix 150 that corresponds to that volume. In an additive manufacturing system with a bi-level material deposit mechanism, this may comprise outputting deposit instructions in the form of "deposit material" (e.g. "1") or "do not deposit material" (e.g. "0"). For example, if a material-use value for a given voxel was 65% and the retrieved halftone threshold value was 50% then as the material-use value is above the threshold value a deposit instruction of "1" may be output for the given voxel. This may be actuated as a deposit of the production material at an output location corresponding to the given voxel. In an additive manufacturing system that arranges a material output without directly depositing a material, a material arrangement instruction indicates a desired discrete material arrangement state (e.g. M units of material at position [x, y, z]) and may be used instead of a "deposit" instruction.

In the example of FIG. 1, the matrix generator 120 is arranged to generate the three-dimensional threshold matrix 150 for use by the halftone generator 110. To do this the matrix generator 120 is arranged to obtain values for a predefined two-dimensional threshold matrix 160. For example, this may comprise values read from a two-dimensional array stored in memory or other computer-readable storage medium. The predefined two-dimensional threshold matrix 160 may be based on one or more of the following threshold matrices: a void-and-cluster matrix; an amplitude modulation (AM) matrix, such as a cluster-dot matrix; and a noise matrix having a predefined color, such as a white noise matrix with uniform random noise or a green noise matrix (e.g. using mid-frequency noise components). The matrix generator 120 is arranged to extend the two-dimensional threshold matrix 160 into a third dimension to generate the three-dimensional threshold matrix 150 by laterally-shifting, with respect to the third dimension and according to a defined sequence, subsequent matrices in a set of two-dimensional matrices comprising at least subsets of the values for the predefined two-dimensional threshold matrix 160 (e.g. each matrix in the set of two-dimensional matrices comprising at least a subset of values for the predefined two-dimensional threshold matrix).

In certain cases, the predefined two-dimensional threshold matrix 160 comprises any suitable halftone or threshold matrix as used in two-dimensional halftoning. The values within the predefined two-dimensional threshold matrix 160 may span a range of pre-defined granularity, such as 12-bit integer values ranging from 0 to 4095. However, any other range or granularity, such as integer or floating point numbers of 8-bit, 9-bit, 10-bit, and others, may be used.

In one case, the apparatus 100 may be implemented as part of an additive manufacturing system, e.g. may comprise electronics or portions of an embedded controller for a "3D printer". In another case, one or more portions of the apparatus 100 may be implemented using computer program code configured to be processed by one or more processors. These processors may form part of an additive manufacturing system (e.g. a computing module of a "3D printer") and/or may form part of a computer device communicatively coupled to the additive manufacturing system (e.g. a desktop computer configured to control a "3D printer" and/or a "3D print driver" installed on the computer device). In one case, the computer device may comprise a server communicatively coupled to an additive manufacturing system; e.g. a user may submit the digital representation 130 from a mobile computing device for processing by the apparatus 100 "in the cloud", the apparatus 100 may then send the deposit instructions 140 to an additive manufacturing system via a network communications channel.

The matrix generator 120 may be arranged to apply different lateral shift routines in order to generate different structures in a three-dimensional object. For example, the defined sequence used to transform subsequent matrices may comprise at least one of a random walk in the third dimension; a defined set of lateral shift parameters for each matrix in the set of two-dimensional matrices; and a set of points on an analytic curve in the third dimension with variation in a first and second dimension. In one case, the matrix generator is configured to determine lateral shift parameters for the set of two-dimensional matrices based on a complementarity metric for at least one of the set of two-dimensional matrices. In this case, the complementarity metric is a measure that compares a production material placement associated with a given two-dimensional matrix with a production material placement for matrices below the given two-dimensional matrix in the set of two-dimensional matrices. For example, a complementarity metric may be optimized or maximized when production material is placed at a given (x, y) location based on a particular sub-matrix, e.g. a sub-matrix associated with a particular z-axis slice or layer, and no material is placed at the same location for one or more previous sub-matrices, e.g. one or more sub-matrices corresponding to z-axis slices or layer below the particular z-axis slice or layer.

In one case, a complementarity metric may indicate a degree of complementarity between two layers and may comprise a percentage of non-empty pixels (e.g. for a two-dimensional slice with a given depth) or voxels from one layer that are at [x, y] coordinates where the other layer is blank or empty. If no non-empty pixels or voxels coincide across the layers at the given [x, y] coordinates, e.g. if at the given [x, y] coordinates a set of pixels or voxels is empty in one layer and non-empty in another layer, the complementarity metric has a value of 100% (or 1 in the range 0-1). If all non-empty pixels or voxels for the slice have corresponding non-empty pixels or voxels in the other layer, e.g. non-empty pixels or voxels coincide across the layers at the given [x, y] coordinates, then the complementarity metric has a value of 0% (or 0 in the range 0-1). In these cases, repeating a common two-dimensional threshold matrix without lateral shifting may result in a low or minimal complementarity (e.g. the latter case). In certain cases, maximizing a complementarity metric may be desirable for a homogeneous distribution of material placement. In other cases, a complementarity metric above a predefined threshold, e.g. representing a defined percentage of coincidence, may be desirable for improved adhesion between layers. In these other cases complementarity need not be maximized, e.g. complementarity values below 100% may be allowed as long as they are above the predefined complementarity threshold.

In one implementation, the digital representation 130 comprises at least one material volume coverage vector for at least one volume of the three-dimensional object. A material volume coverage vector represents a probabilistic distribution of materials available to an additive manufacturing system for production of the three-dimensional object. In one case, each vector represents a proportional volumetric coverage of materials available for production of the three-dimensional object and combinations of said materials. For example, for k materials available for production of the three-dimensional object and L discrete deposit states for said materials, the material coverage vector comprises $L^k$ vector components, each vector component having an associated probability value. In this case, the discrete deposit instructions comprises production instructions from a set of L*k available instruction values, each element at a production resolution having one of L deposit state instructions for each of said k materials. The materials and material combinations defined by the material volume coverage vector may be associated with a number of different material types, e.g. build materials, finishing materials, support or scaffolding materials, agents and powders, including separate use of materials, joint use of materials, and an absence of any materials.

In the above implementation, each material volume coverage vector may be associated with a series of unit volumes referred to herein as "voxels", in a similar manner to the way in which a two-dimensional image is divided into unit areas referred to as "pixels", e.g. "voxels" comprising a "pixel" with depth. In one case, cubic volumes may be used with a common value for each of the height, width and depth of a voxel. In other cases, custom unit volumes or voxels may be defined, e.g. where the unit volume is non-cubic and/or has values of height, width and depth that differ from each other with (although each voxel has the same height, width and depth as other voxels in the raster representation). In certain cases, the unit volume or voxel may be a non-standard or custom-defined three-dimensional shape, e.g. voxels may be based on Delaunay tessellations (e.g. tetrahedra that fill the object) or any other space-filling polyhedra. In this case, the material volume coverage representation may be stored as a set of tuples (e.g. in an array-type structure) with one component of the tuple representing a voxel co-ordinate in three dimensions (e.g. a centroid or bottom corner) and another component of the tuple representing a material volume coverage vector.

To explain the components of a material volume coverage vector, a simple example may be considered. In this simple example, an apparatus is arranged to use two materials to generate a three-dimensional object: M1 and M2. These may be fluid build materials that are deposited on a substrate or platen, e.g. excreted or ejected molten polymers, or they may comprise two deposit-able colored agents that are deposited on one or more layers of powdered build material. In the latter case, in a produced three-dimensional object, each "material" may correspond to a cured combination of the deposit-able agent and a powdered build material. In the former case, in a produced three-dimensional object, each "material" may correspond to a solidified portion of excreted or ejected polymer. In any case, each "material" is deposit-able by an additive manufacturing apparatus to generate a defined volume (e.g. at the production resolution) of an output three-dimensional object.

In this simple example, if the additive manufacturing apparatus is arranged to deposit discrete amounts of each material, e.g. in binary deposits, there are four different material combination states: a first state for the deposit of M1 without M2; a second state for the deposit of M2 without M1; a third state for the deposit of both M1 and M2, e.g. M2 deposited over M1 or vice versa; and a fourth state for an absence of both M1 and M2, e.g. "blank" (Z) or an inhibitor. In this case, the material volume coverage vector has four vector components: [M1, M2, M1M2, Z]. In the case of the last vector component, "blank" or "Z" may represent "empty" or an absence of materials in a processed layer, e.g. if agents are deposited on layers of build material this may denote an absence of build material for the processed layer, even though the build material may not be removed until the complete object has been produced.

In another implementation, the digital representation 130 may comprise material proportions that are associated with each voxel. In this implementation, a percentage of each of materials M1 and M2 are defined for each voxel, e.g. [M1, M2] wherein the vector is normalized to 1 (for ranges of 0-1) or 100% (for percentage ranges).

Figure 2:
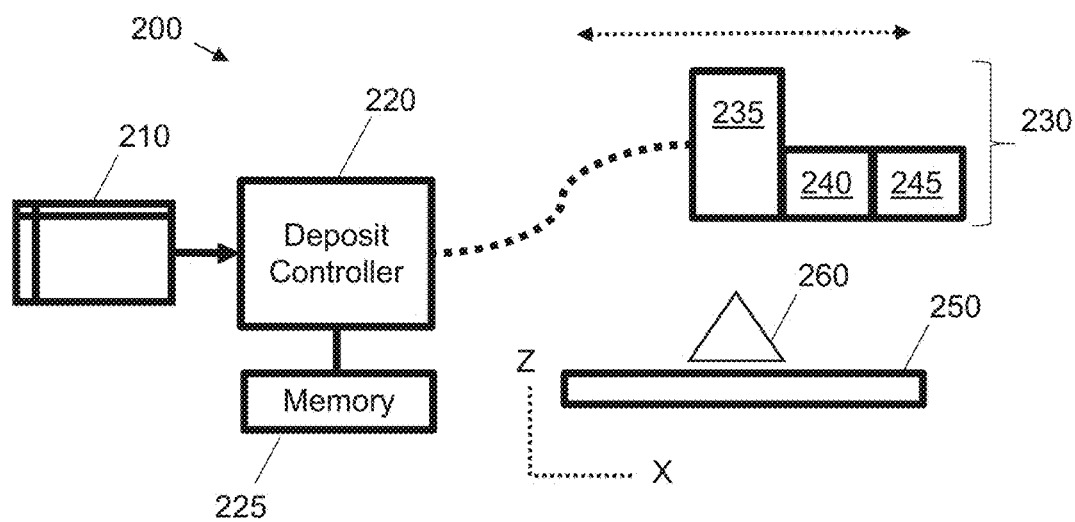
FIG. 2 is a schematic diagram showing an apparatus for production of a three-dimensional object according to an example.

An example of an apparatus arranged to produce a three-dimensional object according to the deposit instructions 140 will now be described with reference to FIG. 2. FIG. 2 shows an example of an apparatus 200 arranged to produce a three-dimensional object 260. The apparatus 200 is arranged to receive data 210 for the three-dimensional object, which may comprise material arrangement or deposit instructions 140 as described below.

In FIG. 2, the apparatus 200 comprises a deposit controller 220 and a memory 225. The deposit controller 220 may comprise one or more processors that form part an embedded computing device, e.g. adapted for use in controlling an additive manufacturing system. Memory 225 may comprise volatile and/or non-volatile memory, e.g. a non-transitory storage medium, arranged to store computer program code, e.g. in the form of firmware. The deposit controller 220 is communicatively coupled to aspects of the apparatus that are arranged to construct the three dimensional object. These comprise a deposit mechanism 230. The deposit mechanism 230 is arranged to deposit production materials to generate the three-dimensional object. In the present case, the deposit mechanism comprises a substrate supply mechanism 235 and an agent ejection mechanism 240, 245. In other cases the deposit mechanism 230 may comprise fewer or additional components, e.g. a substrate supply mechanism may be provided separately from the agent ejection mechanism or omitted, or other components, e.g. the deposit mechanism 230 may comprise a polymer extraction mechanism. In the schematic example of FIG. 2, the agent ejection mechanism 240, 245 comprise two components: a first component 240 for the supply of a first agent (e.g. material M1 as discussed above) and a second component 245 for the supply of a second agent (e.g. material M2 as discussed above). Two materials are presented in this example for ease of explanation but any number of materials may be supplied. Similar materials in the form of agents are described for example. The substrate supply mechanism 235 is arranged to supply at least one substrate layer upon which the materials available for production are deposited by the agent ejection mechanism 240, 245 to produce the three-dimensional object 260. In the present case, the materials comprise agents that are applied to a powder substrate, wherein the combination of agent and powder, following a curing process, form part of the object. However, other implementations are possible, e.g. the materials may be deposited to form part of the object, e.g. as per the polymer case discussed above. In the example of FIG. 2, the three-dimensional object 260 is built layer by layer on a platen 250. The arrangement of the aspects and components shown in FIG. 2 are not limiting; the exact arrangement of each apparatus will vary according to the production technology that is implemented and the model of apparatus.

In the example of FIG. 2 the deposit controller 220 is configured to process and/or otherwise use the data 210 to control one or more components of the deposit mechanism 230. The deposit controller 220 may control one or more of the substrate supply mechanism 235 and the agent ejection mechanism 240, 245. For example, the discrete deposit instructions in the control data 150 may be used by the deposit controller 220 to control nozzles within the agent ejection mechanism. In one implementation, the apparatus 200 may be arranged to use a coalescing agent and a coalescing modifier agent that are respectively supplied by the components of the agent ejection mechanism 240, 245. These agents allow a three-dimensional object to have varying material properties. They may be combined with one or more colored powdered substrate materials, e.g. applied using an inkjet mechanism to deposited powder layers, to generate multi-color objects with varying material properties. If a plurality of powdered substrate materials are available they may also form part of the "materials" of the material volume coverage vector in certain cases. In these cases the generated objects may be constructed by depositing at least the coalescing agent and the coalescing modifier agent on layers of substrate material, e.g. layers of powder or other material forming z-plane slices, followed by the application of energy to bind the material, e.g. infra-red or ultra-violet light. For example, one or more of the substrate supply mechanism 235 and the agent ejection mechanism 240, 245 may be moveable relative to the platen 250, e.g. in one or more of the x, y and z directions (wherein the y axis is into the sheet for FIG. 2). One or more of the substrate supply mechanism 235, the agent ejection mechanism 240, 245 and the platen 250 may be moveable under control of the deposit controller 220 to achieve this. Additionally, one or more inks may also be deposited on cured and/or uncured layers, wherein these inks also form part of the "materials" of the material volume coverage vector. In other implementations the apparatus may comprise part of, amongst others, selective laser sintering systems, stereo lithography systems, inkjet systems, fused deposition modelling systems, any three-dimensional printing system, inkjet deposition systems and laminated object manufacturing systems. These include apparatus that directly deposit materials rather than those described that use various agents.

In one case, the functionality of the apparatus 100 and the deposit controller 220 may be combined in one embedded system that is arranged to receive the digital representation 130, or data useable to produce this, and control the apparatus 200 accordingly. This may be the case for a "stand alone" apparatus that is arranged to receive data 210, e.g. by physical transfer and/or over a network, and produce an object. For example, this apparatus may be communicatively coupled to a computer device that is arranged to send a "print job" comprising the object definition 140, or data useable to produce the object definition 140, to the apparatus in the manner of a two-dimensional printer.

Figure 3:
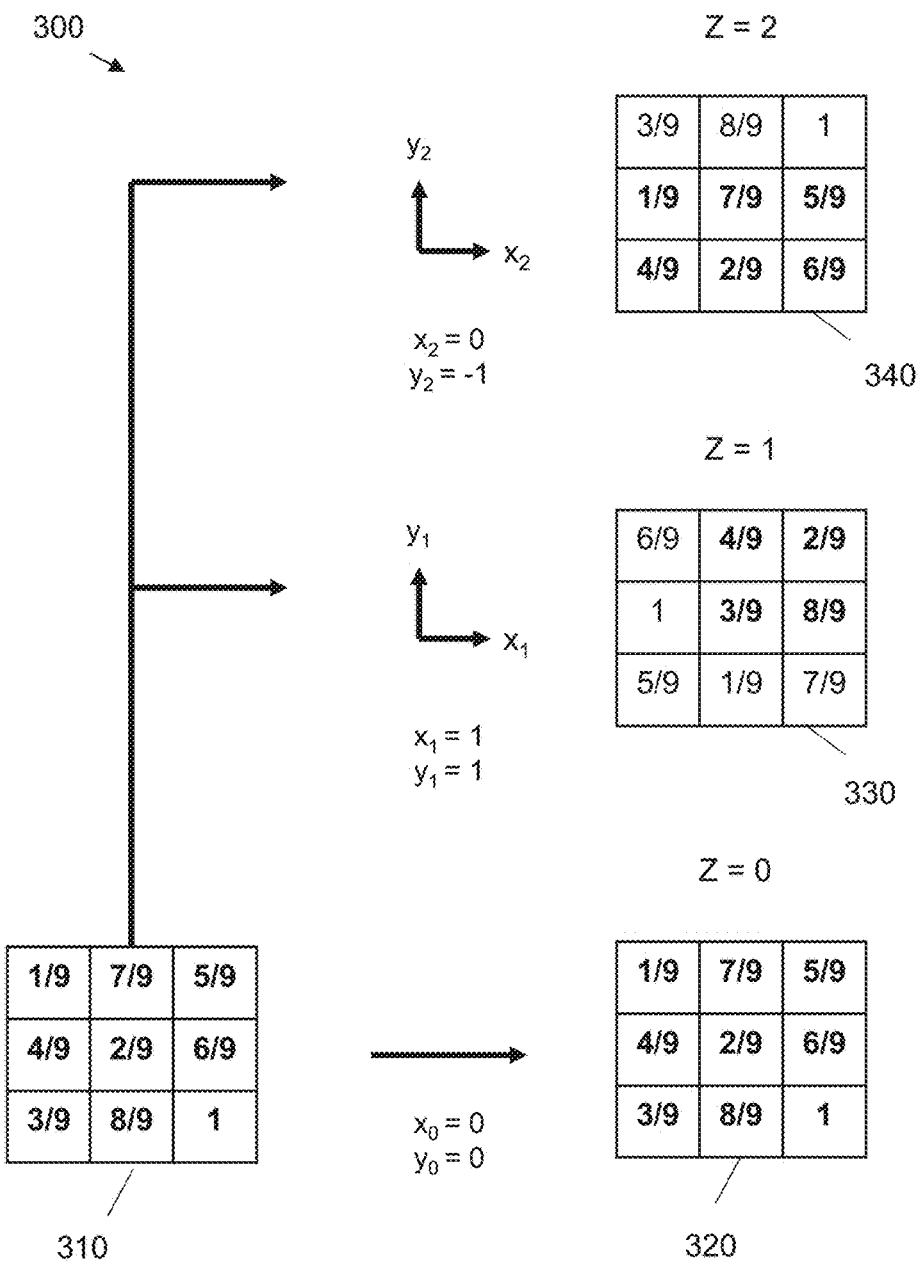
FIG. 3 is a schematic diagram showing a portion of a sequence useable to generate a three-dimensional threshold matrix according to an example.

FIG. 3 shows schematically an example 300 of laterally shifting a predefined two-dimensional threshold matrix 310. In this example, the two-dimensional threshold matrix 310 comprises a 3×3 matrix with threshold values in a range between 0 and 1. In particular, the predefined two-dimensional threshold matrix 310 has values of: [1/9, 7/9, 5/9; 4/9, 2/9, 6/9; 3/9, 8/9, 1]. As described previously, the matrix may be based on at least one of: a void-and-cluster matrix; an AM matrix, such as a cluster-dot matrix; and a noise matrix having a predefined color. The example 300 shows three matrices forming a set of two-dimensional matrices or sub-matrices comprising at least a subset of values for the predefined two-dimensional threshold matrix. In this example, each matrix relates to a particular z-slice. A first matrix 320 relates to a z co-ordinate of 0, a second matrix 330 relates to a z co-ordinate of 1 and a third matrix relates to a z co-ordinate of 2. A three-dimensional halftone matrix comprises the values of each matrix 320 to 340 having the associated z co-ordinate, e.g. {0, 0, 0} has a value of "3/9" and {2, 2, 2} has a value of "1".

In the present example, the first matrix 320 comprises a first set of values from the two-dimensional threshold matrix 310. For example, a given sub-matrix may be shifted in relation to at least one previous sub-matrix according to x and y shift parameters.

At block 440, a three-dimensional halftone threshold matrix for use in production of a three-dimensional object is generated using the processed values for the set of sub-matrices. In one case, the sub-matrices are combined in the third dimension, i.e. values of a sub-matrix comprise values associated with a given set of [x, y] co-ordinates that are associated with a particular z co-ordinate. For example, individual shifted sub-matrices represent different z-slices or layers that may be stacked on top of each other to generate a three dimensional matrix. The resultant three-dimensional halftone matrix from the method 400 is useable to halftone a digital object representation of a three-dimensional object. In particular, processed values for each sub-matrix represent halftone threshold values for application to a section of a digital representation corresponding to a layer of the three-dimensional object. In one case, each sub-matrix may represent threshold values from a given z-layer; in other cases, slices at an angle to a z-plane may be taken and as such threshold values from multiple sub-matrices that are resident in the slice-plane in the three-dimensional matrix may be used.

In one case, the method 400 comprises obtaining the aforementioned digital representation for the three-dimensional object; halftoning the digital representation using the three-dimensional halftone threshold matrix to generate control data for production of the three-dimensional object; and producing the three-dimensional object on an additive manufacturing system using the generated control data. In this case, the halftoning may be performed after a design stage yet before a print stage, e.g. near the end of, or late in, a production processing pipeline. Moreover, the three-dimensional halftone threshold matrix may be differentially generated for different desired structures or substructures without needing modification of the digital representation of the three-dimensional object. This enables flexibility in the design of three-dimensional objects and enables structure choices to be made near a time of production.

In one case, values for the set of sub-matrices are processed in dependence on the obtained digital representation, such that the generation of the three-dimensional halftone threshold matrix is performed after obtaining the digital representation but before halftoning and production of the three-dimensional object. For example, at least one object property defined in the obtained digital representation may be mapped to a particular sequence or path for laterally shifting the sub-matrices. Hence, different structures may be implemented via different sequences or paths independently of object geometry, decoupling said geometry from the structure of the object.

In one case, processing values for the set of sub-matrices comprises: generating a first sub-matrix in the set of sub-matrices using the data comprising values for the halftone threshold matrix, the first sub-matrix being associated with a first z-axis value for the three-dimensional halftone threshold matrix; determining lateral shift parameters for a second sub-matrix, the second sub-matrix being associated with a second z-axis value for the three-dimensional halftone threshold matrix, the lateral shift parameters comprising a first shift parameter for a transformation in relation to an x-axis and a second shift parameter for a transformation in relation to an y-axis; and generating the second sub-matrix by shifting the values for the halftone threshold matrix in each of the two dimensions of said matrix based on the lateral shift parameters. As described above, in certain cases the lateral shift parameters are selected and/or calculated according to a desired structure for the three-dimensional object. In one case, different stacking or shifting functions may be combined into a set of shift parameters represent a composite approach. For example, a cluster-dot (e.g. green-noise, AM-screen) type matrix coupled with a defined path or sequence that provide small (e.g. in relation to the size of the matrix) shifts from layer to layer may be used to enhance a connectedness of production material placements, as well as introducing a micro or sub-structure in the object (e.g. a cluster-dot-type matrix following a helical path at a low percentage coverage results in a corresponding helical-substructure of the object). This may allow direct control of layer-to-layer material connectivity or connectedness in a three-dimensional object. In certain cases, complementarity may be parameterized, e.g. through the use of a complementarity metric, and taken into account in the manner in which halftone threshold matrix is replicated or stacked in three-dimensions. Examples of particular defined paths and halftone threshold matrices are discussed in the other examples above.

In one case, a digital representation of a three-dimensional object may be at least derived from three-dimensional object model data received in a vector-based format, e.g. data from a STereoLithography ".stl" file. In certain cases this may be converted to a predetermined raster resolution. Vector-based formats represent a three-dimensional object using defined model geometry, such as meshes of polygons and/or combinations of three-dimensional shape models. For example, a ".stl" file may comprise a vector representation in the form of a list of vertices in three dimensions, together with a surface tessellation in the form of a triangulation or association between three vertices. The raster representation may comprise a plurality of defined unit voxels or custom voxels, e.g. defined volumes of one or more sizes.

Figure 4:
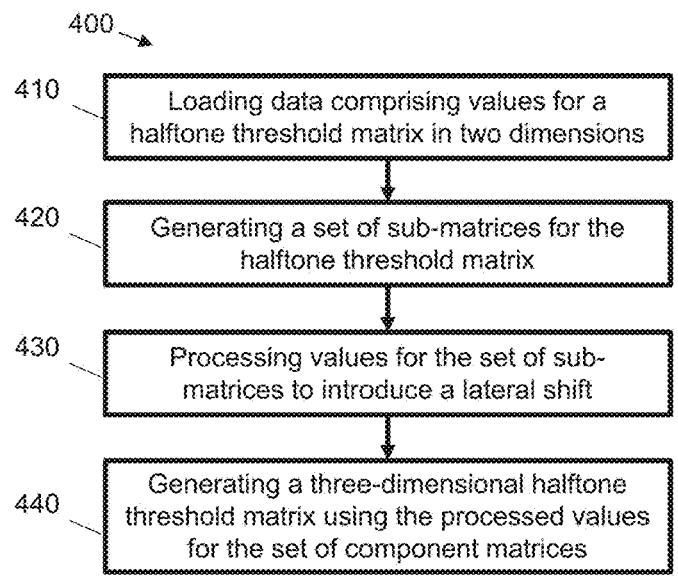
FIG. 4 is a flow diagram showing a computer-implemented method for generating a three-dimensional halftone threshold matrix according to an example.
Figure 5:
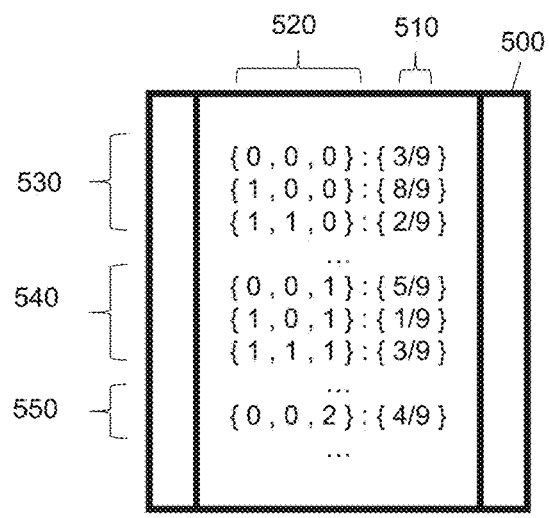
FIG. 5 is a schematic diagram showing an electronic data structure for use in three-dimensional halftoning according to an example.

FIG. 5 shows a representation of an electronic data structure 500 for use in three-dimensional halftoning according to an example. The electronic data structure 500 may be stored in a non-transitory computer-readable storage medium, such as volatile memory, non-volatile memory and magnetic or solid state storage, amongst others. In FIG. 5, the electronic data structure 500 comprises data values 510 defined in association with a plurality of co-ordinates 520 in three-dimensional space. The co-ordinates represent a grid resolution in x, y and z dimensions, e.g. in certain cases may comprise the centers or corners of voxels defined according to a predetermined resolution or set of discrete values in each of the x, y and z dimensions as shown. As discussed below in other examples the co-ordinates need not be explicitly defined. In FIG. 5, the data values 510 comprise threshold values for a three-dimensional halftone operation. They are representative of a plurality of z-dimension planes arranged parallel to the x and y dimensions, e.g. as shown by groupings 530, 540 and 550 in FIG. 5. Grouping 530 has a first common z co-ordinate value ("0"); grouping 540 has a second common z co-ordinate value ("1"); and grouping 550 has a third common z co-ordinate value ("2"). This may be repeated for multiple z-layers. Each set of data values associated with a z-dimension plane (e.g. each of groupings 530, 540 and 550) comprise data values from a predefined two-dimensional halftone threshold matrix, e.g. may comprise the values from each of the three matrices 320, 330 and 340 in FIG. 3. In this case, data values associated with at least one z-dimension plane comprise at least a subset of data values from the predefined two-dimensional halftone threshold matrix that are shifted in one or more of the x and y dimensions, e.g. as shown in FIG. 3. Hence, the electronic data structure 500 of FIG. 5 may be used to store a three-dimensional halftone threshold matrix for use by the halftone generator 110 of FIG. 1 or for use in the method of FIG. 4.

FIG. 5 is shown for example and other formats may be used to store the data values of the electronic data structure. For example, a compact representation of the electronic data structure 500 may alternatively comprise: a definition of a width, depth and height of a three-dimensional halftone threshold matrix; an indicated order for traversing the matrix; and the sequence of data values 510 comprising the threshold values. In this case, the plurality of co-ordinates 520 may not be included; instead they would be implicitly encoded through the other indicated parameters.

Certain system components and methods described herein may be implemented by way of computer program code that is storable on a non-transitory storage medium. The computer program code may be implemented by a control system comprising at least one processor that is arranged to retrieve data from a computer-readable storage medium. The control system may comprise part of an object production system such as an additive manufacturing system. The computer-readable storage medium may comprise a set of computer-readable instructions stored thereon. The at least one processor may be configured to load the instructions into memory for processing. The instructions are arranged to cause the at least one processor to perform a series of actions. The instructions may instruct the method 400 of FIG. 4 and/or any other of the blocks or processes described herein. The non-transitory storage medium can be any media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

Certain examples described herein enable a digital representation of a three-dimensional object, e.g. a three-dimensional raster representation, to be halftoned in a variety of manners to generate different structures and/or substructures. This is achieved by providing an apparatus and method for generating a three-dimensional threshold matrix that may be applied to the digital representation. The three-dimensional threshold matrix is constructed from given two-dimensional slices that are transformed in a manner that controls structure and considers constraints that apply in three-dimensions. The examples described herein may be applied to a complete object, and/or parts of a common object, to enable differentiated structure for the object and/or object parts through the generation of differentiated three-dimensional threshold matrices. Certain examples described herein present ways in which to replicate a two-dimension matrix in a third dimension that provides a frequency uniform output, e.g. that controls amounts of production material that are placed at every slice or layer used in an additive manufacturing system. Different subsets of values from a two-dimension "seed" threshold matrix may be taken that provide the benefits of the seed threshold matrix while allowing for the selection of values that have defined spatial properties.

Certain examples described herein enable a three-dimensional object to be produced with a variety of structures. Certain examples further provide for a robustness of an object substructure by optimizing a connectedness or connectivity between portions of production material forming an output object, e.g. by optimizing a complementarity metric. In certain cases control of object structure or substructure, through lateral shift parameters, provides for a macroscopic material structure in an output object. Moreover, in certain cases, object robustness can be controlled by combining a variety of material structures for a single objects. This enables different material structures to be produced based on a common object design, e.g. in a group of objects produced to the design or in different parts of a common object. The examples described modify a halftone output that is used for the production of three-dimensional objects, e.g. in an additive manufacturing system, through the use of a halftoning-based structure control mechanism. Although for ease of explanation in certain cases, use of a single production material has been described, the examples described herein may be expanded to a multi-material, e.g. with a plurality of production materials, including combinations of production materials.

The preceding description has been presented to illustrate and describe examples of the principles described. This description is not intended to be exhaustive or to limit these principles to any precise form disclosed. Many modifications and variations are possible in light of the above teaching. Techniques, functions and approaches described in relation to one example may be used in other described examples, e.g. by applying relevant portions of that disclosure.

What is claimed is:

1. An apparatus to generate control data for production of a three-dimensional object comprising:
   a processor; and
   a non-transitory storage medium on which is stored instructions that are to cause the processor to:
   apply a halftoning operation to a digital representation at least a portion of the three-dimensional object, wherein the instructions are to cause to the processor to process the digital representation of at least the portion of the three-dimensional object in association with a three-dimensional threshold matrix to output discrete material arrangement instructions for at least one production material;
   generate the three-dimensional threshold matrix for use by the halftone generator, wherein to generate the three-dimensional threshold matrix, the instructions are to cause the processor to:
   obtain values for a predefined two-dimensional threshold matrix; and
   extend the predefined two-dimensional threshold matrix into a third dimension to generate the three-dimensional threshold matrix by laterally- shifting, with respect to the third dimension and according to a defined sequence, at least a subset of the values in subsequent matrices in a set of two-dimensional matrices with respect to the predefined two-dimensional threshold matrix, each matrix in the set of two-dimensional matrices comprising the at least a subset of the values for the predefined two-dimensional threshold matrix,
   wherein the digital representation of at least the portion of the three-dimensional object comprises at least one material volume coverage vector for at least one volume of the three-dimensional object,
   wherein, for k materials available for production of the three-dimensional object and L discrete deposit states for said materials, the at least one material coverage vector comprises $L^k$ vector components, each vector component having an associated probability value, and
   wherein the discrete material arrangement instructions comprise production instructions from a set of L * k available instruction values, each element at a production resolution having one of L deposit state instructions for each of said k materials.

2. The apparatus according to claim 1, comprising:
   a deposit mechanism to deposit available production materials according to the outputted discrete material arrangement instructions.

3. The apparatus according to claim 1,
   wherein the instructions are further to cause the processor to determine lateral shift parameters for the set of two-dimensional matrices based on a complementarity metric for at least one of the set of two-dimensional matrices, and
   wherein the complementarity metric compares a production material placement associated with a given two-dimensional matrix with a production material placement for matrices below the given two-dimensional matrix in the set of two-dimensional matrices.

4. The apparatus according to claim 1, wherein the defined sequence comprises at least one of:
   a random walk in the third dimension;
   a defined set of lateral shift parameters for each matrix in the set of two-dimensional matrices; and
   a set of points on an analytic curve in the third dimension with variation in a first and second dimension.

5. The apparatus according to claim 1, wherein the predefined two-dimensional threshold matrix comprises one of:
   a void-and-cluster matrix;
   an amplitude modulation (AM) matrix; and
   a noise matrix having a predefined color.

6. The apparatus according to claim 1,
   wherein the instructions are further to cause the processor to obtain an object property associated with the three-dimensional object and to select the defined sequence based on the obtained object property,
   the defined sequence implementing a structure of the three-dimensional object that contributes to the obtained object property.

7. An apparatus to generate control data for production of a three-dimensional object comprising:
   a processor; and
   a non-transitory storage medium on which is stored instructions that are to cause the processor to:
   apply a halftoning operation to a digital representation of at least a portion of the three-dimensional object, wherein the instructions are to cause to the processor to process the digital representation of at least the portion of the three-dimensional object in association with a three-dimensional threshold matrix to output discrete material arrangement instructions for at least one production material;
   generate the three-dimensional threshold matrix for use by the halftone generator, wherein to generate the three-dimensional threshold matrix, the instructions are to cause the processor to:

obtain values for a predefined two-dimensional threshold matrix; and extend the predefined two-dimensional threshold matrix into a third dimension to generate the three-dimensional threshold matrix by laterally-shifting, with respect to the third dimension and according to a defined sequence, at least a subset of the values in subsequent matrices in a set of two-dimensional matrices with respect to the predefined two-dimensional threshold matrix, each matrix in the set of two-dimensional matrices comprising the at least a subset of the values for the predefined two-dimensional threshold matrix, wherein the instructions are further to cause the processor to determine lateral shift parameters for the set of two-dimensional matrices based on a complementarity metric for at least one of the set of two-dimensional matrices, and wherein the complementarity metric compares a production material placement associated with a given two-dimensional matrix with a production material placement for matrices below the given two-dimensional matrix in the set of two-dimensional matrices.

* * * * *

UNITED STATES PATENT AND TRADEMARK OFFICE
CERTIFICATE OF CORRECTION

PATENT NO. : 10,445,929 B2
APPLICATION NO. : 15/544504
DATED : October 15, 2019
INVENTOR(S) : Peter Morovic et al.

Page 1 of 1

It is certified that error appears in the above-identified patent and that said Letters Patent is hereby corrected as shown below:

In Column 11, Line 59, Claim 1, delete "laterally- shifting" and insert -- laterally-shifting --, therefor.

Signed and Sealed this
Thirty-first Day of December, 2019

Andrei Iancu
*Director of the United States Patent and Trademark Office*